US010029335B2

(12) United States Patent
Beerens et al.

(10) Patent No.: US 10,029,335 B2
(45) Date of Patent: Jul. 24, 2018

(54) APPARATUS FOR ASSEMBLING A COMPOSITE ARRANGEMENT

(71) Applicant: Mahle International GmbH, Stuttgart (DE)

(72) Inventors: Christoph Beerens, Stuttgart (DE); Antonio Menonna, Ditzingen (DE); Lothar Pfizenmaier, Lichtenwald (DE); Roland Schacherer, Geisingen (DE)

(73) Assignee: Mahle International GmbH (DE)

( * ) Notice: Subject to any disclaimer, the term of this patent is extended or adjusted under 35 U.S.C. 154(b) by 292 days.

(21) Appl. No.: 14/761,620

(22) PCT Filed: Jan. 16, 2014

(86) PCT No.: PCT/EP2014/050808
§ 371 (c)(1),
(2) Date: Jul. 16, 2015

(87) PCT Pub. No.: WO2014/111472
PCT Pub. Date: Jul. 24, 2014

(65) Prior Publication Data
US 2015/0360331 A1 Dec. 17, 2015

(30) Foreign Application Priority Data
Jan. 17, 2013 (DE) .......................... 10 2013 200 638

(51) Int. Cl.
*F01L 1/00* (2006.01)
*B23P 11/02* (2006.01)
(Continued)

(52) U.S. Cl.
CPC ............. *B23P 11/025* (2013.01); *F01L 1/047* (2013.01); *F16D 1/0858* (2013.01); *F16H 25/16* (2013.01);
(Continued)

(58) Field of Classification Search
CPC ....... B23P 11/025; F16H 53/025; F16H 25/16; F01L 1/047; F01L 2001/0471;
(Continued)

(56) References Cited

U.S. PATENT DOCUMENTS 3,999,277 A * 12/1976 Hamada .................... F16D 1/06
29/447
4,597,365 A * 7/1986 Madaffer ................ F01L 1/047
123/90.6
(Continued)

FOREIGN PATENT DOCUMENTS

DE 10024768 A1 11/2001
DE 10134840 A1 1/2003
(Continued)

OTHER PUBLICATIONS

German Search Report for DE-102013200638.1, dated Nov. 11, 2013.
(Continued)

Primary Examiner — Richard Chang
(74) Attorney, Agent, or Firm — Fishman Stewart PLLC

(57) ABSTRACT

An apparatus for assembling a composite arrangement including a plurality of functional elements each having an aperture for a shaft, in a predetermined angular position on the shaft, may include a plurality of retaining devices each intended for accommodating a functional element. The retaining devices may be arranged vertically one above another such that the apertures of the functional elements may lie on a vertical line. The apparatus may also include a vertically movable guide slide for the shaft so that a joining of the shaft with the functional elements may take place in a vertical direction. The apparatus may also include a heating device by which at least two functional elements may be heated simultaneously. The apparatus may further include a gripping device by which at least two functional
(Continued)

elements which are to be joined may be removed together from the heating device and introduced into the retaining devices.

20 Claims, 2 Drawing Sheets

(51) Int. Cl.
*F16H 25/16* (2006.01)
*F01L 1/047* (2006.01)
*F16D 1/08* (2006.01)
*F16H 53/02* (2006.01)
*F16B 4/00* (2006.01)

(52) U.S. Cl.
CPC ........ *F16H 53/025* (2013.01); *B23P 2700/02* (2013.01); *F01L 2001/0471* (2013.01); *F01L 2103/01* (2013.01); *F16B 4/006* (2013.01); *Y10T 29/49293* (2015.01); *Y10T 29/49826* (2015.01); *Y10T 29/49865* (2015.01); *Y10T 29/49867* (2015.01); *Y10T 29/53439* (2015.01); *Y10T 74/18296* (2015.01)

(58) Field of Classification Search
CPC ................ F01L 2103/01; F16D 1/0858; Y10T 29/49293; Y10T 29/49865; Y10T 29/53439; Y10T 29/49867; Y10T 74/18296; Y10T 29/49826; F16B 4/006
See application file for complete search history.

(56) References Cited

U.S. PATENT DOCUMENTS

| | | | | |
|---|---|---|---|---|
| 4,604,510 A * | 8/1986 | Laughlin | ................. | C21D 9/30 148/575 |
| 4,616,389 A * | 10/1986 | Slee | ...................... | B23P 11/025 29/447 |
| 5,054,182 A * | 10/1991 | Riemscheid | ............ | B23P 19/04 29/281.5 |
| 7,775,186 B2 * | 8/2010 | Sakurai | ................ | B21D 53/845 123/90.16 |
| 9,492,896 B2 * | 11/2016 | Beerens | ................... | F16H 25/16 |
| 9,512,872 B2 * | 12/2016 | Menonna | ................ | F16C 17/04 |
| 2006/0005385 A1 * | 1/2006 | Quaas | ................... | B23P 11/025 29/888.08 |
| 2015/0053044 A1 | 2/2015 | Qin | | |

FOREIGN PATENT DOCUMENTS

| | | |
|---|---|---|
| DE | 102004032587 A1 | 2/2006 |
| DE | 102004049272 A1 | 4/2006 |
| DE | 102007056638 A1 | 5/2009 |
| DE | 102008064194 A1 | 7/2010 |
| DE | 102009023612 A1 | 12/2010 |
| DE | 102009060349 A1 | 6/2011 |
| DE | 102009060350 A1 | 6/2011 |
| DE | 102010055123 A1 | 6/2012 |
| DE | 102011001499 B3 | 8/2012 |
| EP | 0892156 B1 | 3/2002 |
| EP | 1392469 B1 | 2/2007 |
| JP | 2000-073709 A | 3/2000 |
| JP | 2002-028827 A | 1/2002 |
| WO | WO-02/096596 A1 | 12/2002 |

OTHER PUBLICATIONS

English abstract for JP2002-28827.
English abstract for DE-102004049272.
English abstract for JP2000-73709.
English abstract for DE-102009060350.
English abstract for DE-102008064194.
English abstract for DE-102007056638.
English abstract for DE-102011001499 B3.
English abstract of EP1392469B1.
English abstract of DE10134840A1.
English abstract of EP0892156B1.
English abstract of DE10024768A1.
English abstract of DE102010055123A1.
English abstract of DE102009060349A1.
English abstract of DE102004032587A1.
English abstract of DE102009023612A1.
European Opinion for EP 14700690.2 dated Aug. 10, 2017.

* cited by examiner

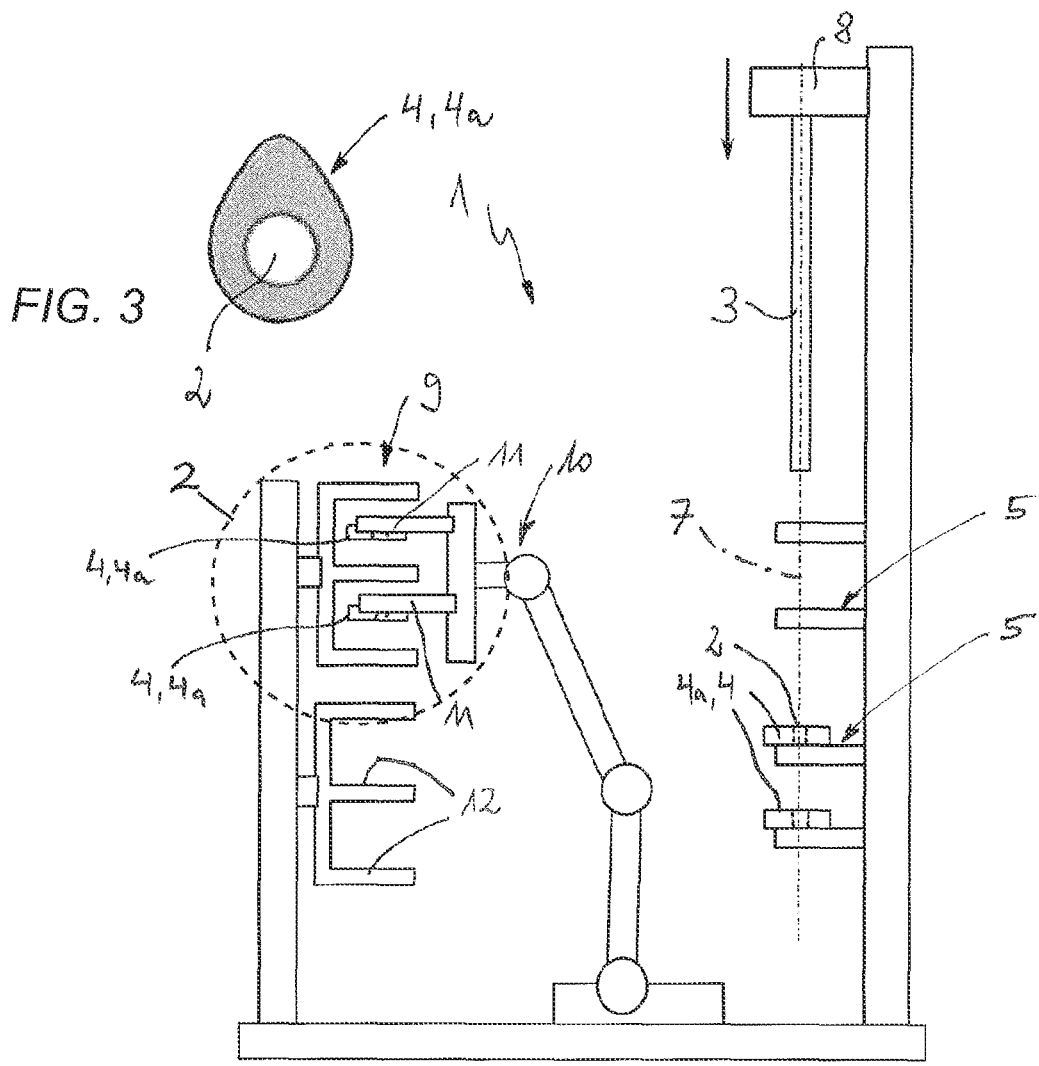
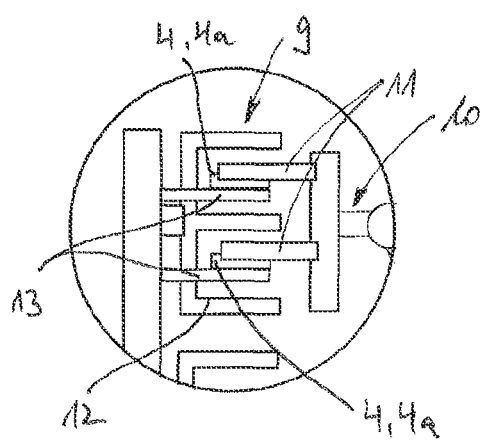
FIG. 3
FIG. 1
FIG. 2

APPARATUS FOR ASSEMBLING A COMPOSITE ARRANGEMENT

CROSS-REFERENCE TO RELATED APPLICATIONS

This application claims priority to German Patent Application No. 10 2013 200 638.1, filed Jan. 17, 2013, and International Patent Application No. PCT/EP2014/050808, filed Jan. 16, 2014, both of which are hereby incorporated by reference in their entirety.

TECHNICAL FIELD

The present invention relates to an apparatus for assembling a composite arrangement, consisting of a plurality of functional elements having an aperture for a shaft, in a predetermined angular position on the shaft. The invention also relates to a method for the thermal joining of a shaft with several functional elements.

BACKGROUND

From DE 10 2007 056 638 A1 a generic device is known for assembling a composite arrangement, consisting of a plurality of functional elements having an aperture for a shaft, in particular cams, balancing masses, toothed wheels and/or bearings, in a predetermined angular position on the shaft, wherein the device has a plurality of retaining devices intended respectively for a functional element.

From DE 10 2008 064 194 A1 an apparatus is known for the positioning of a plurality of functional elements having an aperture for a shaft, in particular cams, in a predetermined angular position on the shaft, wherein the apparatus has a plurality of mounts intended respectively for a functional element, which mounts are equipped respectively with a moulding fixing the angular position of the respective functional element corresponding to the angular position on the shaft. The mounts are able to be positioned here such that the apertures of the functional elements lie on a shared horizontal line.

From DE 10 2009 060 350 A1 an apparatus is known for assembling a shaft carrying functional elements, wherein the apparatus comprises a machine platform, on which a plurality of positioning discs for the aligned, correct positioning of the functional elements is arranged in such a manner that a shaft can be pushed in. The positioning discs are reversibly fixed on a frame, which in turn is reversibly fixed on the machine platform. This is intended to make possible rapid changing of a production process by having several frames available.

SUMMARY

The present invention is concerned with the problem of indicating an improved embodiment for an apparatus of the generic type, which in particular simplifies a thermal joining process.

This problem is solved according to the invention by the subjects of the independent claims. Advantageous embodiments are the subject of the dependent claims.

The present invention is based on the first general idea of modifying an apparatus for assembling a plurality of functional elements having an aperture for a shaft, such that the individual functional elements are mounted in vertical arrangement in the apparatus, so that a thermal joining of a shaft with the functional elements can take place in vertical direction. Through the vertical joining, for example the inserting of the cooled shaft from above into the heated functional elements which are arranged vertically one above the other, in particular a high-outlay guidance of the shaft, which has been necessary hitherto, can be dispensed with, because the guiding of the shaft is already undertaken by gravity. In the apparatuses known from the prior art, a joining of the shaft to the functional elements always takes place in horizontal direction, which requires a frequent and laborious supporting of the shaft during the joining process. The apparatus according to the invention is suitable in particular for the joining of cams, balancing masses, toothed wheels and/or bearings in a predefined angular position on the shaft, wherein the apparatus has a plurality of retaining devices each intended for accommodating a functional element. These retaining devices are arranged vertically one above the other so that the apertures of the functional elements lie on a vertical line. In order to be able to service the apparatus in a generally better manner and to configure it so as to be more easily accessible, a separately arranged heating device is provided for heating the functional elements, wherein at least two, preferably all functional elements which are to be joined are able to be removed together from the heating device by a gripping device and introduced into the retaining devices of the apparatus. The apparatus according to the invention therefore offers the great advantage that a heating and a joining of the functional elements takes place at different locations, whereby the individual stations are less complex and better accessible and are thereby also easier to service.

In an advantageous further development of the invention, the retaining devices are constructed either as mounts, which are equipped respectively with a moulding fixing the angular position of the respective functional element corresponding to the angular position on the shaft, or as assembly grippers, which fix the respective functional element during the joining operation. The functional elements can be introduced into the mounts in an accurately fitting manner, whereas the assembly grippers can grip and fix the functional elements. Of course, it is conceivable here that both the mounts and also the assembly grippers are adjustable and movable, in order to compensate deviations in the alignment of the functional elements.

Expediently, the grippers of the gripping device and/or the assembly grippers are constructed at least partially from a material which is not able to be heated inductively, in particular from ceramic, or are even able to be actively cooled. Additionally or alternatively, provision can also be made that the heating device has retaining balconies, on which the functional elements which are to be heated are able to be deposited, wherein the retaining balconies are constructed at least partially from a material which is not able to be heated inductively, in particular from ceramic, or are able to be cooled. Through the material of the retaining balconies which is not able to be heated inductively, it can be prevented that the latter expand and warp during the heating of the functional elements. In the same way, it is also advantageous, in so far as the grippers of the gripping device are constructed from a material which is not able to be heated inductively, that these can then hold the functional elements during the inductive heating, without, in so doing, having to receive stresses which are too great.

In an advantageous further development of the apparatus according to the invention, the heating device has at least two induction coils which are able to be controlled independently of each other. By means of such a heating device, an individual heating of the functional elements can be achieved, so that for example different functional elements with an individual heating requirement can be heated in one and the same heating device.

Expediently, the apparatus has a device for holding a bearing frame or a cylinder head cover. Hereby, not only the production of a camshaft, but at the same time also its installation into a bearing frame or a cylinder head cover is possible in only one single working step.

The invention is further based on the general idea of indicating a method for the thermal joining of a shaft with a plurality of functional elements having an aperture for the shaft, in particular cams, balancing masses, toothed wheels and/or bearings, by means of a previously described apparatus, in which at least two functional elements are introduced together by the gripping device into the heating device and are heated therein. Subsequently, the at least two functional elements are removed together from the heating device by the gripping device and are introduced into the retaining devices of the apparatus such that the apertures of the functional elements lie on a shared substantially vertical line. The shaft is now pushed by means of a vertically movable guide slide from above through the aligned apertures of the functional elements, wherein a temperature equalization, fixing the functional elements on the shaft, is awaited. Lastly, the shaft together with the functional elements fixed thereon is removed from the apparatus. Through the vertical joining process, the shaft aligns itself owing to gravity and does not have to be guided laboriously. It is conceivable here that the retaining devices position the functional elements only directly before an introducing of the shaft, so that the apertures thereof lie on a shared substantially vertical line. The retaining devices can move here against a stop or similar, whereby a higher degree of positioning accuracy can be achieved.

Further important features and advantages of the invention will emerge from the subclaims, from the drawings and from the associated figure description with the aid of the drawings.

It shall be understood that the features mentioned above and to be further explained below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown here, respectively diagrammatically,

FIG. 1 illustrates a first apparatus for assembling a plurality of functional elements having an aperture for the shaft, FIG. 2 illustrates an enlarged view of a portion of the apparatus of FIG. 1, FIG. 3 illustrates a top view of a functional element.

DETAILED DESCRIPTION

Figure 4:
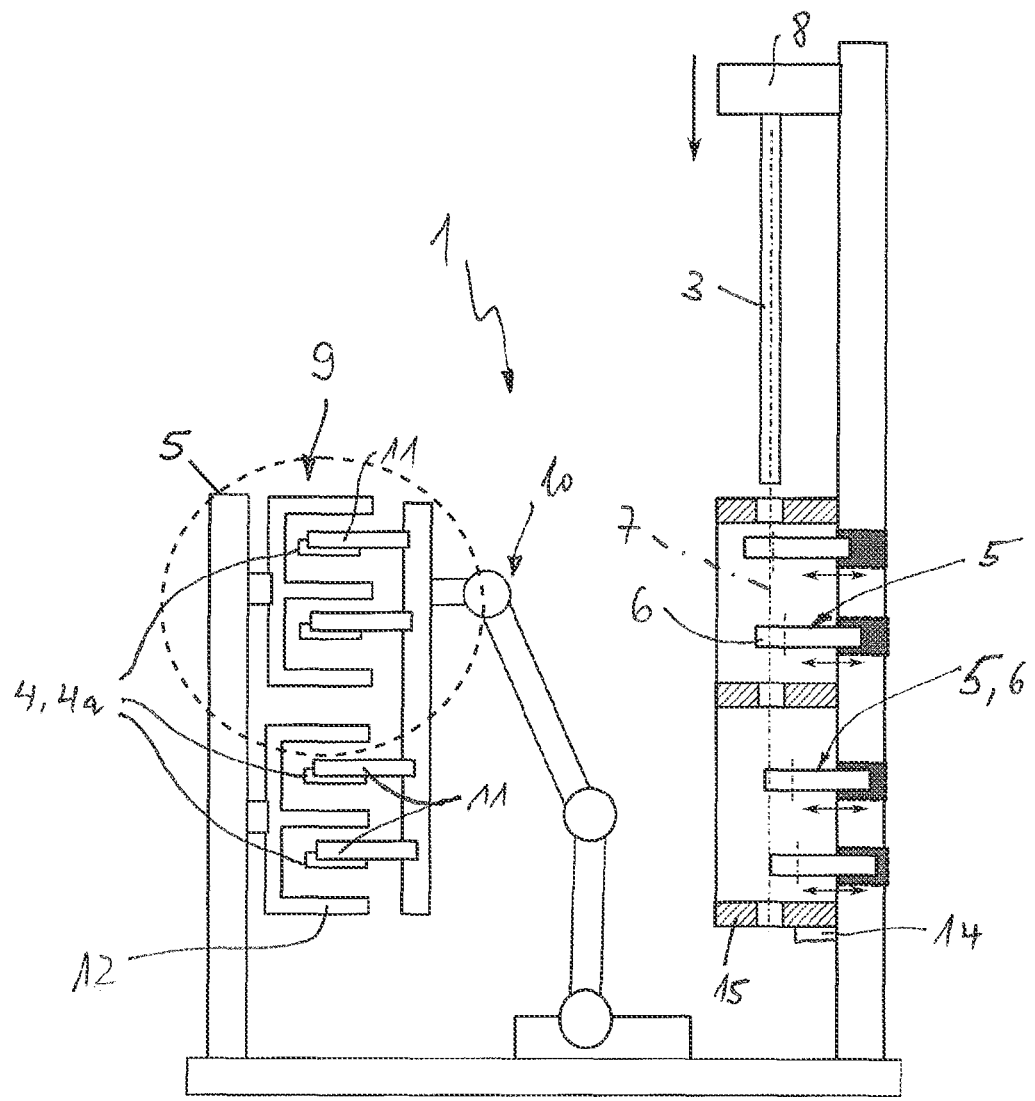
FIG. 4 illustrates an apparatus according to another exemplary approach.
Figure 5:
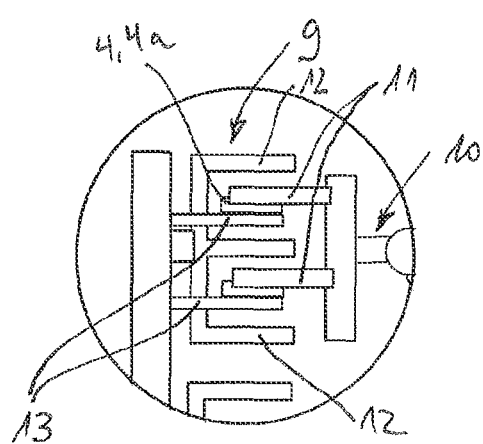
FIG. 5 illustrates an enlarged view of a portion of the apparatus of FIG. 4.

According to the figures, an apparatus 1 according to the invention for assembling a plurality of functional elements 4 having an aperture 2 for a shaft 3 in a predetermined angular position on the shaft 3 has a plurality of retaining devices 5 each intended for a functional element 4. The retaining devices 5 can have mounts here, which are equipped respectively with a moulding fixing the angular position of the respective functional element 4 corresponding to the angular position on the shaft 3. The mouldings preferably have an at least partial negative contour of the functional elements 4, 4a, so that these are received therein at the precise angle. Alternatively, the retaining devices 5 can also have assembly grippers 6, which fix the respective functional element 4 during the joining operation.

The retaining devices 5 are arranged vertically one above the other, so that the apertures of the functional elements 4 lie on a vertical line 7. Furthermore, a vertically movable guide slide 8 is provided for the shaft 3, so that a joining of the shaft 3 with the functional elements 4 takes place in vertical direction. This offers the particular advantage that the shaft 3 which is to be joined already aligns itself owing to the gravity acting on it, so that a laborious aligning, hitherto necessary during horizontal joining, can preferably be dispensed with entirely.

At least two functional elements 4 can be heated simultaneously via a separately arranged heating device 9. With the gripping device 10 arranged in the centre, at least two (cf. FIG. 1), preferably all (cf. FIG. 4) functional elements 4, 4a which are to be joined can be removed together from the heating device 9 and introduced into the retaining devices 5 of the apparatus 1. The heating device 9 has retaining balconies 13 here, on which the functional elements 4, 4a which are to be heated are able to be deposited, wherein the retaining balconies 13 are constructed at least partially from a material which is not able to be heated inductively, in particular from ceramic, or are able to be cooled. Alternatively, the functional elements 4, 4a can also be held by grippers 11 of the gripping device 10 during the heating. The grippers 11, like the assembly grippers 6, can be constructed at least partially from a material which is not able to be heated inductively, in particular from ceramic, or can be able to be cooled.

The heating device 9 can have at least two induction coils 12 which are able to be controlled independently of one another, so that an individual heating, suited to requirements, of different functional elements 4 is possible.

In addition, the apparatus 1 can have a device 14 for holding a bearing frame 15 for the shaft 3, wherein a positioning of the bearing frame 15 relative to the apparatus 1 can take place via at least two positioning elements, in particular alignment pins, such that a bearing channel of the bearing frame 15 is aligned to the apertures 2 of the individual functional elements 4, so that the shaft 3 can be simply pushed through the apertures 2 of the functional elements 4 and the bearing channel of the bearing frame 15 aligned thereto.

Generally, a thermal joining of the shaft 3 takes place with a plurality of functional elements 4 having an aperture 2 for the shaft 3, in particular cams 4a, balancing masses, toothed wheels and/or bearings, by means of the previously described apparatus 1 as follows:

Firstly, at least two functional elements 4 are introduced with the gripping device 10 together into the heating device 9 and are heated therein. After the heating, the at least two functional elements 4 are removed with the gripping device 10 together from the heating device 9 and introduced into the retaining devices 5 of the apparatus 1. The retaining devices 5 are or become positioned so that the apertures 2 of the functional elements 4 lie on a shared substantially vertical line 7. By means of the vertically movable guide slide 8, the shaft 3 is now pushed from above through the apertures 2 of the functional elements 4, whereupon a temperature equalization fixing the functional elements 4 on the shaft 3 is awaited. Finally, the shaft 3 together with functional elements 4 fixed thereon can be removed from the apparatus 1.

If a bearing frame 15 or a cylinder head cover, not described in further detail, is also to be installed, this is held in position before the introduction of the shaft 3 by means of the device 14 and namely so that its bearing channel is arranged aligned to the apertures 2 of the functional elements 4. The retaining devices 5 can also position the functional elements 4 only directly before an introduction of the shaft 3 so that the apertures 2 thereof lie on a shared substantially vertical line 7.

With the apparatus 1 according to the invention and with the method according to the invention, the thermal joining of functional elements 4 on shafts 3 can be distinctly simplified, because through the vertical joining a hitherto necessary laborious aligning of the shaft 3 is now undertaken principally by gravity, and therefore no longer has to be take place additionally manually in a laborious manner. Through the separate heating device 9, the accessibility and hence also the ease of maintenance of the apparatus 1 can be increased. Through the gripping device 10, nevertheless, a fully automatic joining can take place.

The invention claimed is:

1. An apparatus for assembling a composite arrangement including a plurality of functional elements each having an aperture for a shaft, in a predetermined angular position on the shaft, the apparatus comprising:
   a plurality of retaining devices each intended for accommodating one of the plurality of functional elements, the retaining devices being arranged vertically one above another such that the apertures of the functional elements lie on a vertical line,
   a vertically movable guide slide for the shaft, so that a joining of the shaft with the plurality of functional elements takes place in a vertical direction,
   a heating device by which at least two of the plurality of functional elements are able to be heated simultaneously, and
   a gripping device by which the at least two of the plurality of functional elements are able to be removed together from the heating device and introduced into the retaining devices of the apparatus.

2. The apparatus according to claim 1, wherein each of the plurality of retaining devices includes at least one of:
   a mount having a moulding fixing an angular position of the one of the plurality of functional elements accommodated by the retaining device, the angular position of the one of the plurality of functional elements corresponding to an angular position on the shaft, or
   an assembly gripper, which fixes the one of the plurality of functional elements accommodated by the retaining device during the joining of the shaft with the plurality of functional elements.

3. The apparatus according to claim 1, wherein the gripping device includes grippers constructed at least partially from a material which is not able to be heated inductively or are able to be cooled.

4. The apparatus according to claim 1, wherein the heating device has at least two induction coils which are able to be controlled independently of one another.

5. The apparatus according to claim 2, wherein the moulding of the mount of each of the plurality of retaining devices has an at least partial negative contour corresponding to a contour of the one of the plurality of functional elements accommodated by the retaining device, so that the one of the plurality of functional elements is able to be received by the retaining device at a precise angle.

6. The apparatus according to claim 1, further comprising a device for holding at least one of a bearing frame and a cylinder head cover.

7. The apparatus according to claim 1, wherein the heating device has at least one retaining balcony, on which at least one of the plurality of functional elements, which is to be heated, is able to be deposited, wherein the at least one retaining balcony is constructed at least partially from a material which is not able to be heated inductively or to be cooled.

8. The apparatus according to claim 1, wherein each of the retaining devices is individually movable, so that the retaining device can assume at least two different retaining positions in at least one of which the retaining device is positioned so that the apertures of the functional elements lie on the vertical line.

9. A method for the thermal joining of a shaft with a plurality of functional elements each having an aperture for the shaft, comprising:
   introducing, by a gripping device of an apparatus, at least two of the plurality of functional elements together into a heating device of the apparatus,
   heating, by the heating device, the at least two of the plurality of functional elements,
   moving, by the gripping device, the at least two of the plurality of functional elements together from the heating device and into retaining devices of the apparatus positioned so that the apertures of the at least two of the plurality of functional elements lie on a shared substantially vertical line,
   pushing, by a vertically movable guide slide, the shaft through the apertures of the at least two of the plurality of functional elements,
   equalizing a temperature to fix the at least two of the plurality of functional elements on the shaft, and
   removing the shaft together with at least two of the plurality of functional elements fixed thereon from the apparatus.

10. The method according to claim 9, further comprising positioning the retaining devices so that the apertures of the at least two of the plurality of functional elements lie on the shared substantially vertical line only directly before pushing of the shaft through the apertures.

11. The apparatus according to claim 2, wherein grippers of at least one of the gripping device or the assembly grippers are constructed at least partially from a material which is not able to be heated inductively or are able to be cooled.

12. The apparatus according to claim 2, wherein the heating device has at least two induction coils which are able to be controlled independently of one another.

13. The apparatus according to claim 11, wherein the heating device has at least two induction coils which are able to be controlled independently of one another.

14. The apparatus according to claim 7, wherein the material is ceramic.

15. The apparatus according to claim 2, wherein each of the retaining devices is individually movable, so that the retaining device can assume at least two different retaining positions in at least one of which the retaining device is positioned so that the apertures of the functional elements lie on the vertical line.

16. The apparatus according to claim 3, wherein each of the plurality of retaining devices includes a mount having a moulding that has an at least partial negative contour corresponding to a contour of the one of the plurality of functional elements accommodated by the retaining device, so that the one of the plurality of functional elements is able to be received by the retaining device at a precise angle.

17. The apparatus according to claim 2, further comprising a device for holding at least one of a bearing frame and a cylinder head cover.

18. The apparatus according to claim 2, wherein the heating device has at least one retaining balcony, on which at least one of the plurality of functional elements, which is to be heated, is able to be deposited, wherein the at least one retaining balcony is constructed at least partially from a material which is not able to be heated inductively or to be cooled.

19. The apparatus according to claim 4, wherein each of the plurality of retaining devices includes a mount having a moulding that has an at least partial negative contour corresponding to a contour of the one of the plurality of functional elements accommodated by the retaining device, so that the one of the plurality of functional elements is able to be received by the retaining device at a precise angle.

20. An apparatus for assembling a composite arrangement including a plurality of functional elements each having an aperture for a shaft, in a predetermined angular position on the shaft, the apparatus comprising:
- a plurality of retaining devices each intended for accommodating one of the plurality of functional elements, the retaining devices being arranged vertically one above another such that the apertures of the functional elements lie on a vertical line, the retaining devices including mounts each having a moulding with an at least partial negative contour of a corresponding functional element so that the corresponding functional element is able to be received at a precise angular position corresponding to the angular position on the shaft,
- a vertically movable guide slide for the shaft, so that a joining of the shaft with the plurality of functional elements takes place in a vertical direction,
- a heating device by which at least two of the plurality of functional elements are able to be heated simultaneously, the heating device having at least two induction coils independently controllable, and
- a gripping device by which the at least two of the plurality of functional elements are able to be removed together from the heating device and introduced into the retaining devices of the apparatus.

* * * * *